US012726373B1

(12) United States Patent
Fan et al.

(10) Patent No.: US 12,726,373 B1
(45) Date of Patent: Sep. 1, 2026

(54) SPATIAL AUDIO SYSTEM FOR VIDEOCONFERENCING

(71) Applicant: Zoom Video Communications, inc., San Jose, CA (US)

(72) Inventors: Yifeng Fan, Foster City, CA (US); Zhaofeng Jia, Saratoga, CA (US); Gang Shi, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/421,540

(22) Filed: Jan. 24, 2024

(51) Int. Cl.
*H04L 12/18* (2006.01)
*H04S 7/00* (2006.01)

(52) U.S. Cl.
CPC .......... *H04L 12/1822* (2013.01); *H04S 7/304* (2013.01); *H04S 2420/01* (2013.01)

(58) Field of Classification Search
CPC ... H04L 12/1822; H04S 7/304; H04S 2420/01
USPC .......................................................... 709/204
See application file for complete search history.

(56) References Cited

U.S. PATENT DOCUMENTS 8,675,067 B2 * 3/2014 Chou ..................... H04N 7/147 348/149
9,131,205 B2 9/2015 Gillies et al.
11,240,621 B2 2/2022 Li et al.
12,335,060 B1 6/2025 Ryskamp et al.
2020/0359158 A1 * 11/2020 Brimijoin, II ............ G06F 3/16
2023/0177771 A1 * 6/2023 Assarsson ............... G06T 15/06 345/420
2023/0353678 A1 11/2023 Jia et al.
2023/0413004 A1 * 12/2023 Binn ....................... H04S 7/303
2024/0147177 A1 5/2024 Jia et al.
2025/0193625 A1 6/2025 Jia et al.

* cited by examiner

*Primary Examiner* — Adil Ocak
(74) *Attorney, Agent, or Firm* — Kilpatrick Townsend & Stockton, LLP

(57) ABSTRACT

Systems and methods for spatial audio generation for videoconferencing are provided. For example, a computing device detects the head pose of a user of a video conference. The device further determines a first relative direction of a participant user interface (UI) element for an active speaker of the video conference with respect to the user based on a first position of the participant UI element and the head pose of the user. The device generates spatial audio for an audio signal of the active speaker based on the first relative direction and outputs the spatial audio. The device further generates an updated spatial audio based on a second relative direction towards a second location closer to a center location than the first relative direction. The center location is determined based on the head pose of the user. The device outputs the updated spatial audio.

20 Claims, 10 Drawing Sheets

400

SPATIAL AUDIO SYSTEM FOR VIDEOCONFERENCING

FIELD

The present application generally relates to videoconferencing, and more particularly relates to generating spatial audio for videoconferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
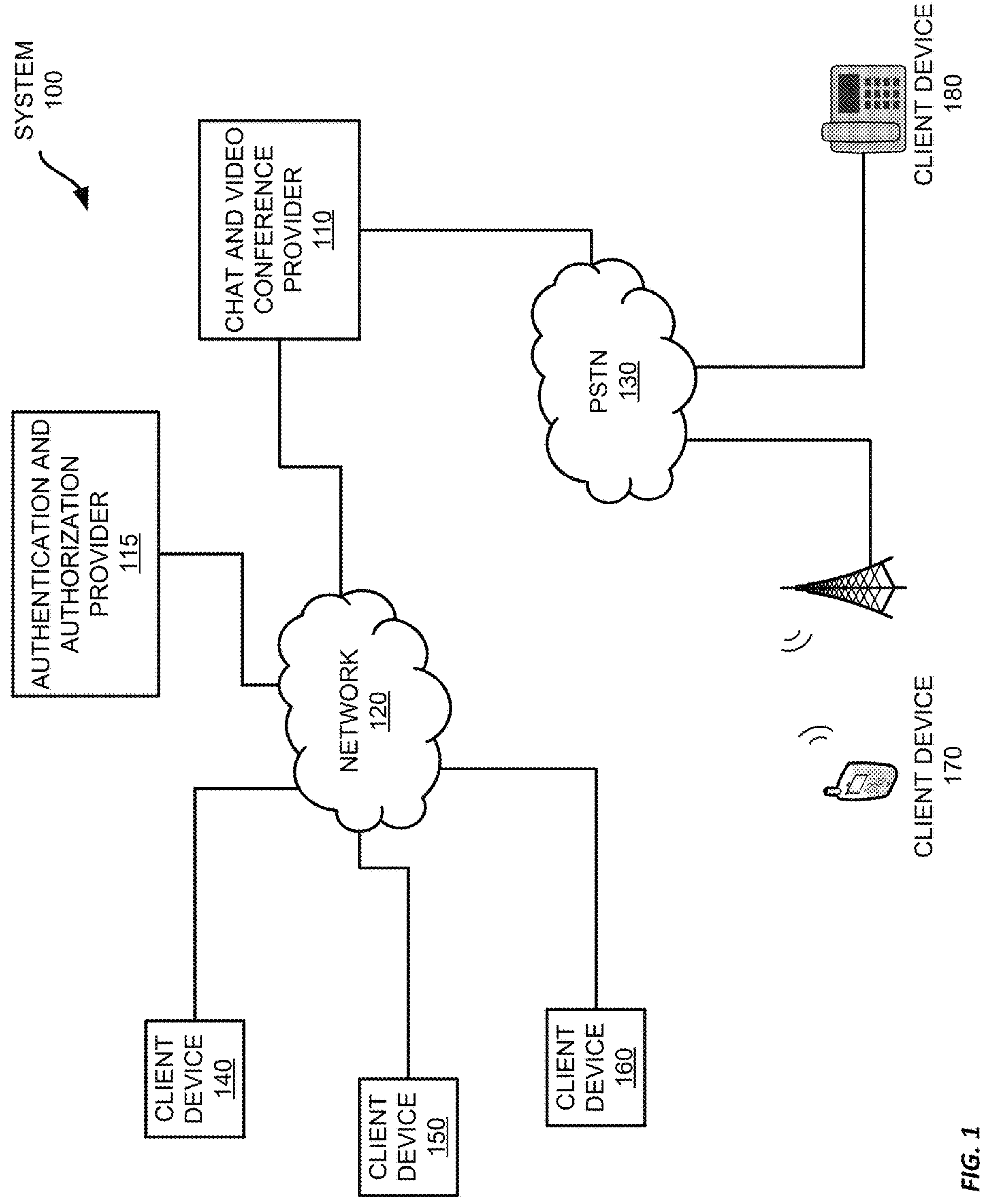
FIG. 1 shows an example system that provides videoconferencing functionality to various client devices, according to certain aspects described herein.

Examples are described herein in the context of systems and methods for spatial audio generation for videoconferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

Spatial audio is an important way to fully immerse users in virtual reality (VR) applications. It offers location cues to help users find the exact direction and distance of the sound. Spatial audio also facilitates speech intelligibility and alleviates fatigue. When sounds come from different directions, the user distinguishes different speaker's speech and localizes the speaker much easier. As such, adding spatial audio effects in the video-conferencing platform can help the video conference participants to be more engaged in the meeting thereby increasing the efficiency of the video conference.

To achieve the above goal, example systems and methods for generating spatial audio for videoconferencing are provided. As described herein, a client computing device receives the audio signal of an active speaker of a video conference. To generate the spatial audio for the received audio signal, the client computing device detects the head pose of the user appearing in front of the client computing device such as by analyzing a video of the user captured by a camera of the client computing device. The client computing device further detects the location of a participant user interface (UI) element representing the active speaker on a user interface for the video conference presented on a display screen of the client computing device. Based on the head pose and the location of the participant UI element for the active speaker, the relative direction and distance between the user and the participant UI element can be determined. Spatial sound techniques, such as the head-related transfer functions (HRTFs), can be utilized to generate the spatial audio for the active speaker's audio. The spatial audio can be played by the client computing device as if the sound was coming from the location of the participant UI element for the active speaker.

In some cases, there can be more than one active speaker and the above process can be repeated for each active speaker's audio signal. For example, the locations of the respective participant UI elements for the respective active speakers on the screen can be determined. For each of the active speakers, the relative direction and distance with respect to the user can be determined. Spatial audio can be generated for each active speaker's audio and these spatial audios can be combined, such as through a linear combination, to generate the final spatial audio for output.

In further examples, the client computing device can also shift the direction of the spatial audio gradually towards a center direction with respect to the user. The center direction can be determined as the forward direction of the user (i.e., the direction that the user is facing). The direction shifting can be performed in multiple steps with each step moving toward the center direction by a step size. At each step, the spatial audio signal is generated for the newly shifted direction. If the new direction points to a new location for the participant UI element, the user interface for the video conference can be modified by moving the participant UI element for the active speaker to the new location. The move can be implemented by switching the participant UI element for the active speaker with another participant UI element at the new location. Once the direction of the spatial audio reaches the center direction, the spatial audio generation can be stopped and the received active speaker's audio signal can be played.

In scenarios where an active speaker becomes inactive (e.g., remain silent for over a threshold amount of time), the direction shifting can be stopped. The direction shifting for another active speaker may be carried out, which may lead to the participant UI element for the previous active speaker being moved away from the center location.

As described herein, certain embodiments provide improvements to videoconferencing by solving problems that are specific to online platforms. Compared with real conference rooms, the existing video-conferencing platform does not contain spatial audio, which means the users could not perceive the sound in different spatial locations as they usually do in real conference environments. By adding spatial audio effects, the users feel that the sound comes from the active speaker's location, which brings a more immersive experience to the video-conferencing platform. Further, with the spatial audio, the audio information and visual information of an active speaker are aligned spatially, allowing the participants to locate the speaker accurately, thereby increasing the meeting efficiency. In addition, by considering the head pose of individual users when generating the spatial audio, the sound effect is customized for each user rendering the spatial audio effect more realistic.

This illustrative example is given to introduce the reader to the general subject matter discussed herein and the disclosure is not limited to this example. The following sections describe various additional non-limiting examples and examples of systems and methods for active speaker detection for videoconferencing.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
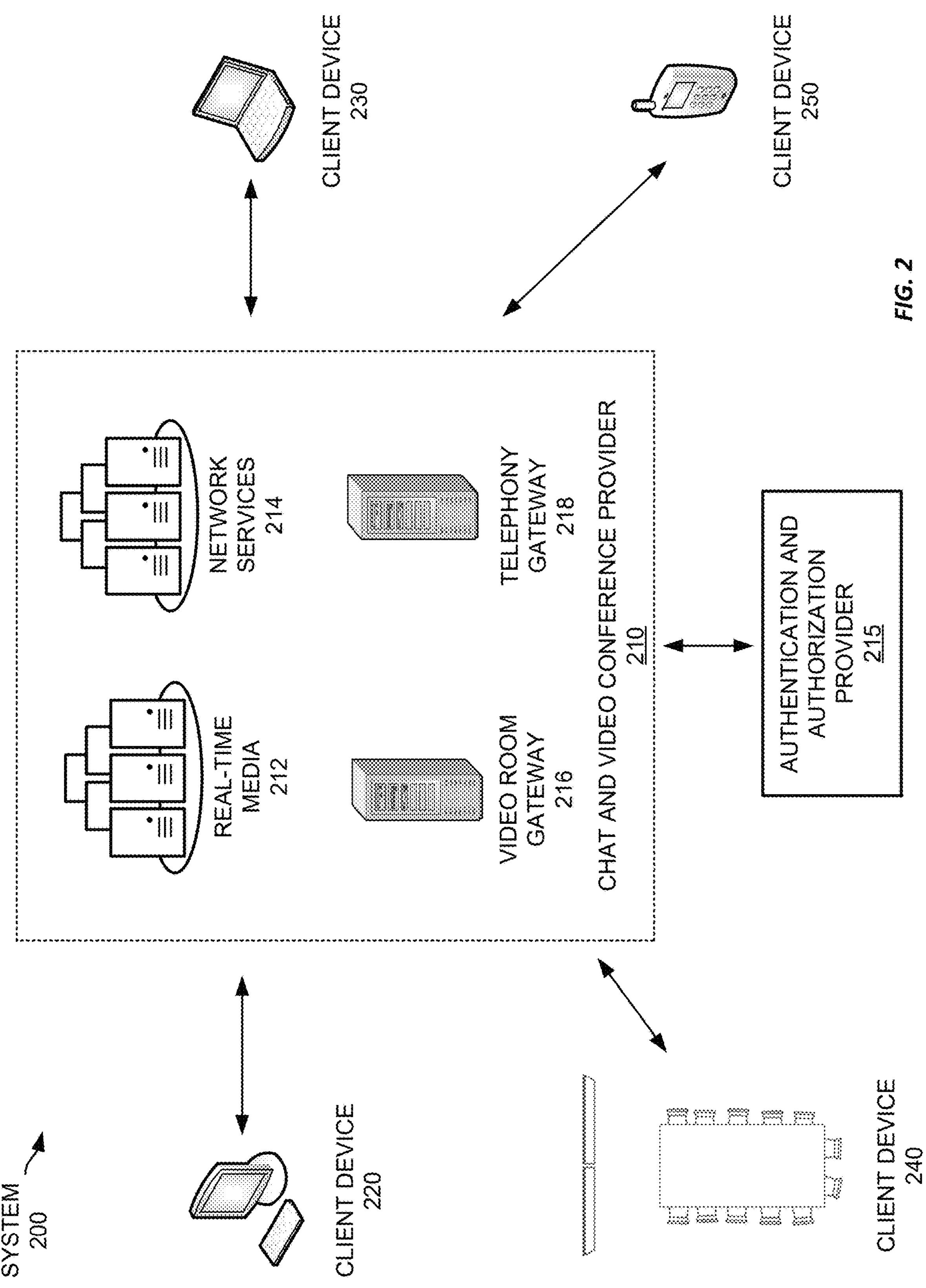
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating speech transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryptions may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some examples according to the present disclosure, a user may select an option to use one or more optional AI features available from the virtual conference provider. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to provide training data for the underlying AI models, the user may be provided with an option to consent, or deny consent, to access and use some or all of the user's personal information. In general, the goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

Figure 3:
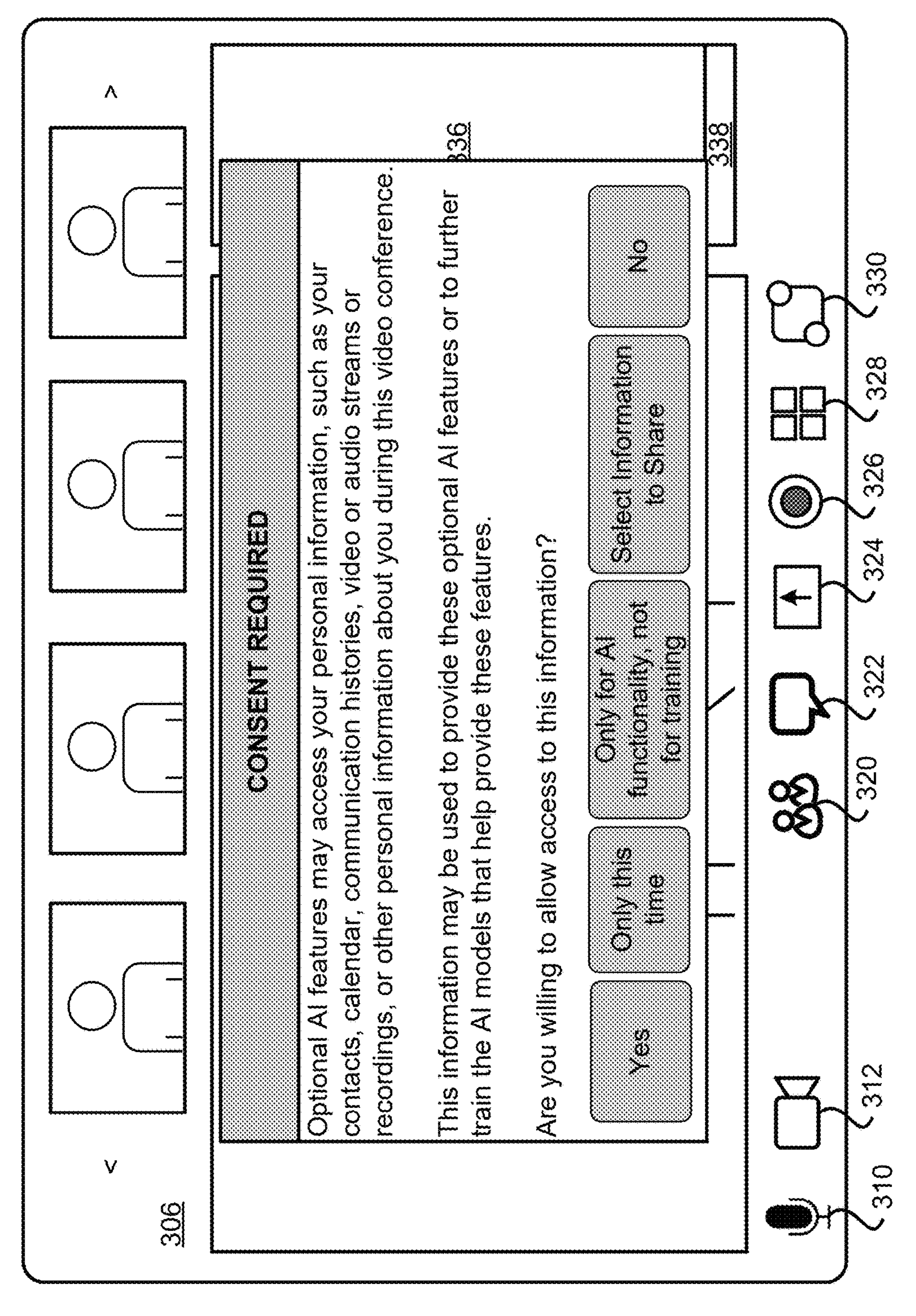
FIG. 3 shows an example of a user interface configured to display a consent authorization window for a user who has engaged in a video conference to interact with and to select options to use an available optional AI feature, according to certain aspects of the present disclosure.

As can be seen in FIG. 3, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 4:
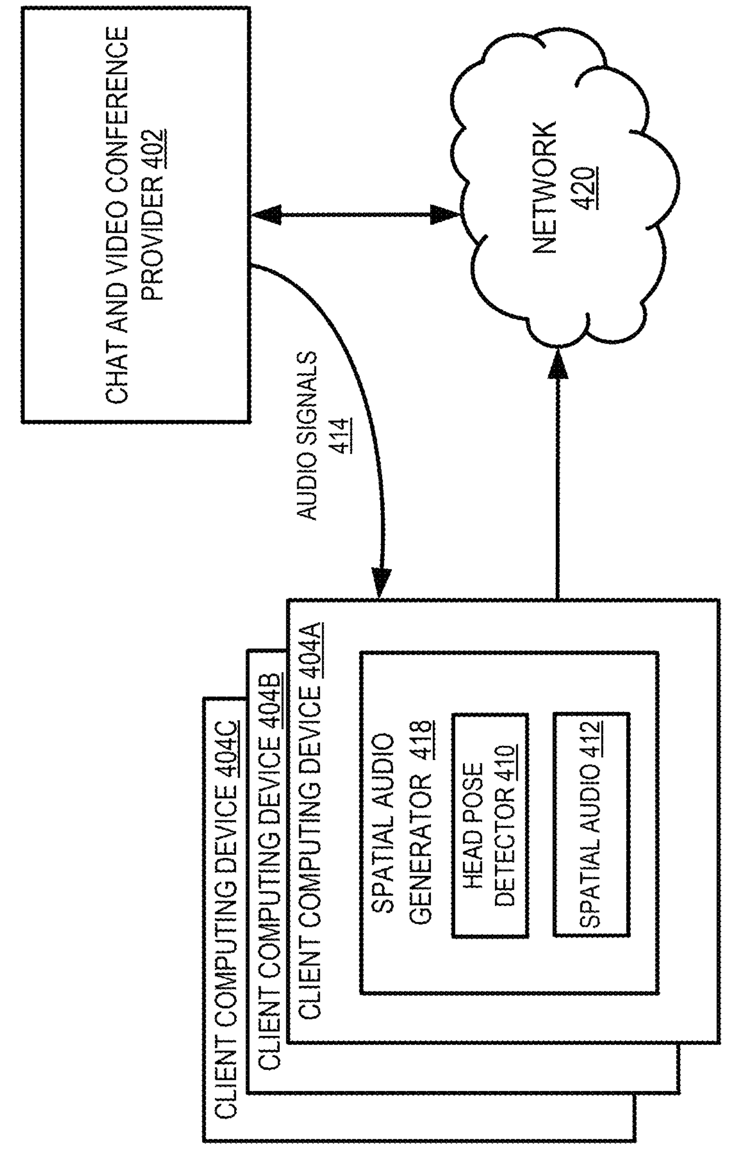
FIG. 4 shows an example of an operating environment for spatial audio generation for videoconferencing, according to certain aspects of the present disclosure.

Referring now to FIG. 4, FIG. 4 shows an example of an operating environment 400 for spatial audio generation for videoconferencing, according to certain aspects described herein. The operating environment 400 includes a chat and video conference provider 402 and client computing devices 404A-404C (which may be referred to herein individually as a client computing device 404 or collectively as the client computing devices 404). The chat and video conference provider 402 is configured to host and provide various functionalities of video conferences, such as the chat and video conference provider 110 and the chat and video conference provider 210 described above with respect to FIGS. 1 and 2, respectively. The chat and video conference provider 402 can collect and deliver videoconferencing streams to client computing devices. The video conferencing streams include video signals of the participants, audio signals 414 captured at respective client computing devices associated with the participants, and other signals or streams regarding the participants. The client computing devices 404 may be the client devices 140-180 and 220-250 discussed above with respect to FIGS. 1 and 2.

Each client computing device 404 can include a spatial audio generator 418 configured to generate spatial audio 412 for the video conference throughout the video conference based on the audio signals 414 sent from the chat and video conference provider 402. The audio signals 414 include audio signals of one or more active speakers. The chat and video conference provider 402 can determine the active speaker by, for example, selecting one or more speakers whose audio signal energy is higher than the remaining speakers. Other ways of determining the active speakers can also be utilized. The audio signals of these selected active speakers are transmitted to the client computing devices 404.

To generate the spatial audio 412, the spatial audio generator 418 can determine the head pose of the user appearing in front of the client computing device 404. The head pose may be determined using face recognition technology by analyzing a video of the user captured by a camera of the client computing device 404. The head pose can include the relative orientation and position of the user head with respect to the camera. The spatial audio generator 418 can further determine the location of each active speaker. In some examples, the location of an active speaker is determined as the location of the participant UI element representing the active speaker in the UI for the video conference that is presented on a display screen associated with the client computing device. Based on the head pose of the user and the location of the active speakers, the spatial audio generator 418 can determine the relative direction and distance between the user and each active speaker to generate individual spatial audio for the audio signals of the active speakers. The individual spatial audio can be combined to generate the final spatial audio 412 which can be played on the client computing device. Additional details regarding generating the spatial audio will be provided below with respect to FIGS. 5-9.

Figure 5:
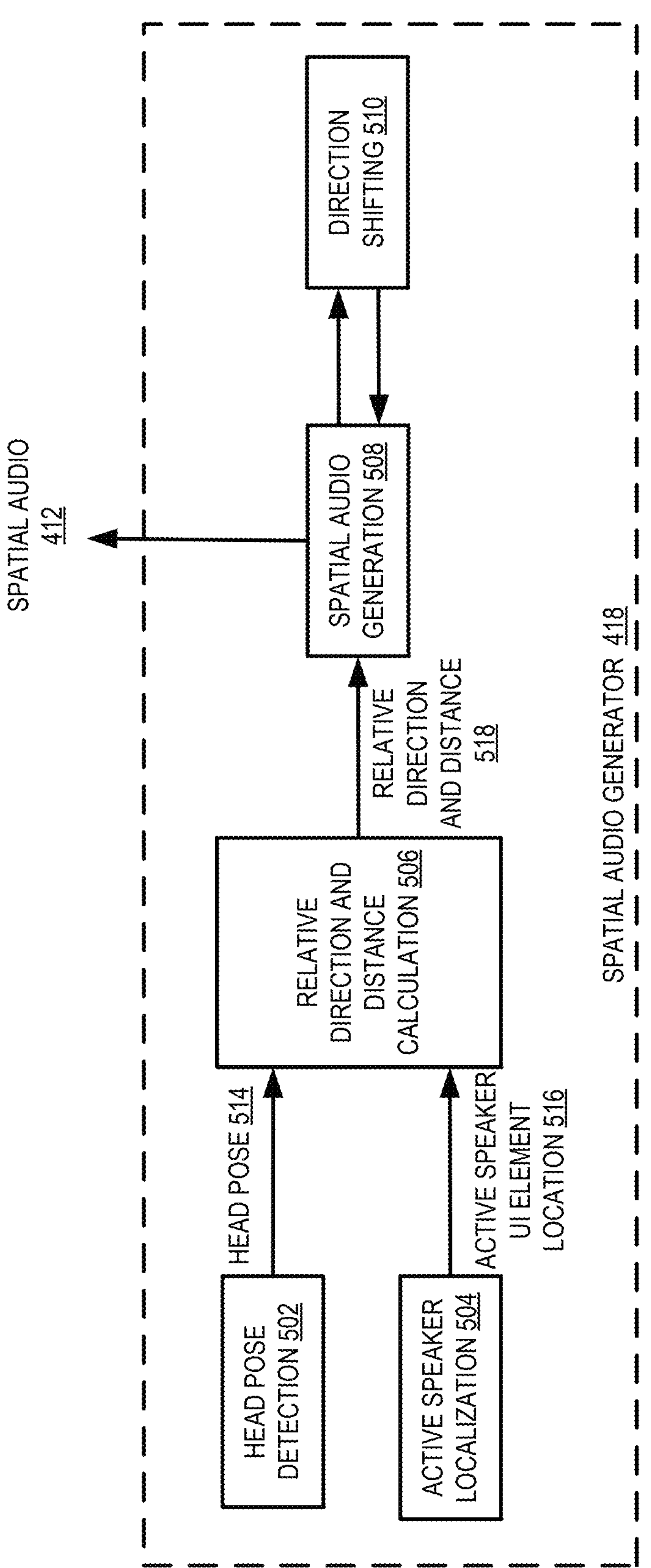
FIG. 5 shows a block diagram of the workflow in the spatial audio generation for videoconferencing, according to certain aspects of the present disclosure.

Referring now to FIG. 5, FIG. 5 shows a block diagram of the workflow in the spatial audio generator 418, according to certain aspects of the present disclosure. As shown in FIG. 5, the head pose detection 502 can be performed by analyzing a video of the user appearing in front of the camera associated with the client computing device 404. The video can be the video transmitted to the chat and video conference provider 402. As discussed above with respect to FIG. 1, the head pose can include the relative orientation and position of the user with respect to the camera. For instance, the head pose detector 410 can locate the face of the user in the frames of the video using face detection techniques. The head pose detector 410 then captures the facial landmarks on the located face. Based on the facial landmarks, the head pose of the user can be estimated. It should be understood that the video-based head pose detection is described for illustration only and should not be construed as limiting. Other methods, such as detecting head pose using Bluetooth earbuds, machine learning technology, etc. could also be used to estimate the head pose of the user.

The active speaker localization 504 involves determining the location of the active speaker which in some examples is represented by a participant UI element for the active speaker presented on a display screen of the client computing device. FIG. 6 shows an example of a display screen 604 presenting a user interface 606 of a video conference application used by a user 602 to join a video conference, according to certain aspects of the present disclosure. In this example, user interface 606 includes a primary display area 612 showing the videos or images of the participants in respective participant UI elements 620. In the example shown in FIG. 6, there are 9 participant UI elements corresponding to 9 participants of the video conference including a participant UI element for an active speaker with the border highlighted. The user interface 600 further includes a tool area at the bottom showing the icons of various tools that can be invoked for the video conferencing, such as the chat tool, the tool for displaying the participant list, the tool for sharing screen, the tool for recording the meeting, and the tools for configuring the microphone and the camera of the client computing device 404. The display screen 604 further includes an integrated camera 608 at the top edge to capture the video of the user 602.

In the example shown in FIG. 6, the participant UI element for the active speaker is located at an original location 614, the left spot of the middle row. The spatial audio generator 418 can calculate the location (the original location 614) of this UI element in the 3D space based on information such as the size of the display screen, the location of the camera, the location of the UI 606 on the display screen, and the location of the UI element within the UI 606.

Figure 7:
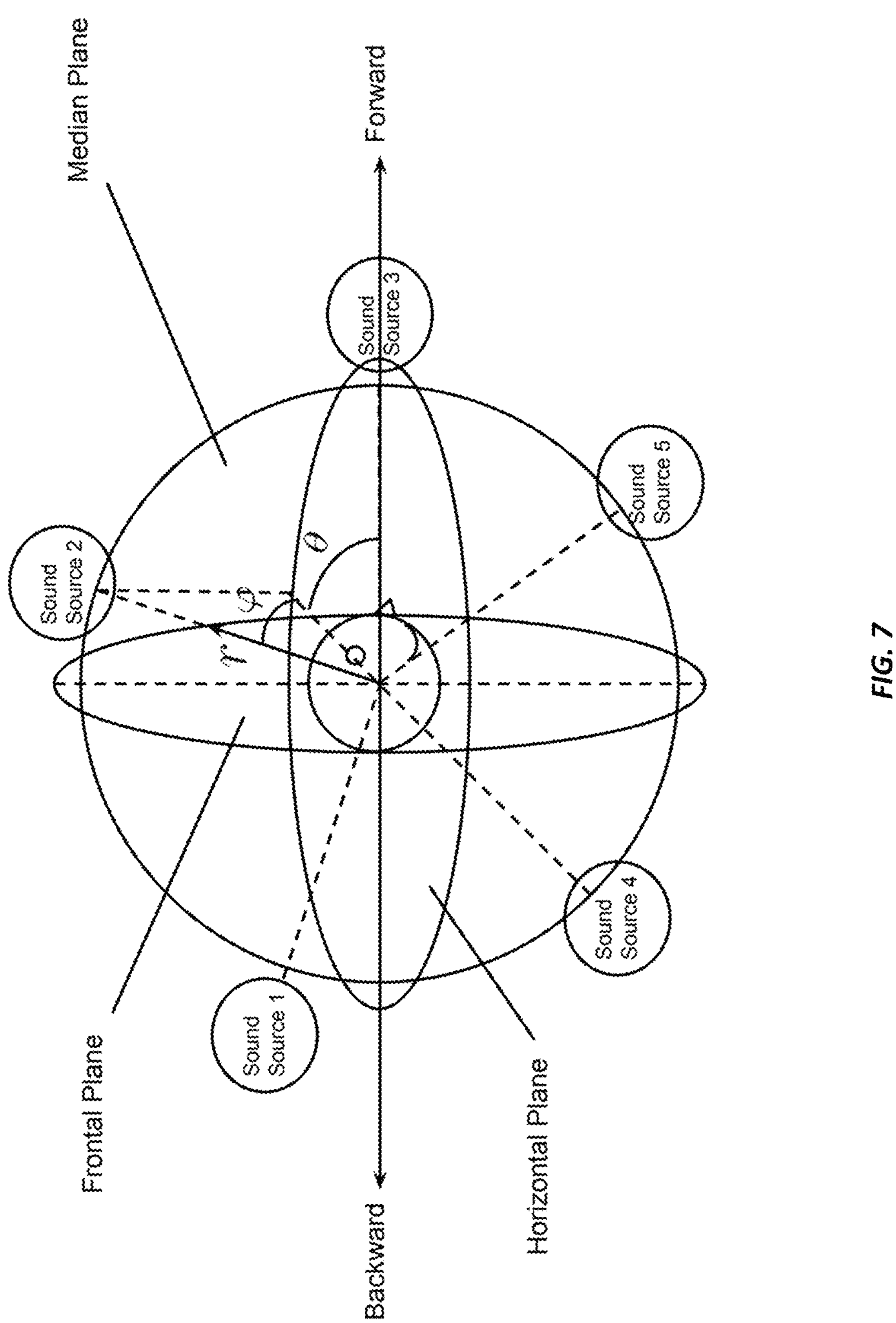
FIG. 7 shows an example of the three-dimensional space with sound sources placed at different locations, according to certain aspects of the present disclosure.

Based on the head pose of the user and the determined location of the participant UI element for the active speaker, the spatial audio generator 418 can perform the relative direction and distance calculation 506. In some examples, the relative direction is represented by the azimuth angle θ and the elevation angle ϕ as shown in FIG. 7. In FIG. 7, there are five sound sources representing five different active speakers. The head in the middle of the five sound sources represents the user 602. The head position is detected through the head pose detection 502. In FIG. 7, the azimuth angle θ and the elevation angle ϕ are labelled for sound source 2, as well as the relative distance r of the sound source 2 location to the user. The relative distance r can be calculated based on the distance between the user 602 and the camera 608 estimated during the head pose detection as well as the distance between the participant UI element at the original location 614 and the camera 608. When the sound source moves or the user moves the head, the θ, ϕ, and r will change accordingly. In video-conferencing platforms, most of the time, the sound sources are in the front, but in some scenarios, the listener's head might rotate backwards, which results in the sound sources coming from behind.

Referring back to FIG. 5, based on the calculated relative direction and distance between the user 602 and the original location 614, the spatial audio generator 418 can perform the spatial audio generation 508. In some examples, HRTFs are used to generate the spatial audio for each active speaker's audio signal based on the audio signal, the azimuth angle, elevation angle, and distance information. HRTFs can be stored at discrete spatial directions. Therefore, in some cases, HRTF interpolation is performed. An example of using spherical harmonics to interpolate HRTF is given below.

The spherical harmonic basis functions are defined as:

$$y_{nm}(\phi,\theta)=\begin{cases}\sqrt{\frac{(2n+1)}{4\pi}}P_n^m(\sin(\theta)), \text{ for } m=0\\ \sqrt{\frac{(2n+1)}{2\pi}\frac{(n-|m|)!}{(n+|m|)!}}P_n^m(\sin(\theta))\cos(m\phi), \text{ for } m>0\\ \sqrt{\frac{(2n+1)}{2\pi}\frac{(n-|m|)!}{(n+|m|)!}}P_n^{|m|}(\sin(\theta))\cos(|m|\phi), \text{ for } m<0\end{cases}. \tag{1}$$

Here, $$P_n^m$$

represents the associated Legendre polynomial P of order n and degree m. An arbitrary continuous spherical function $f(\phi, \theta)$ can be expanded as:

$$f(\phi,\theta)=\sum_{n=0}^{P}\sum_{m=-n}^{n}Y_{nm}(\phi,\theta)C_{nm}. \tag{2}$$

Here, $C_{nm}$ is the spherical harmonic coefficients. For arbitrary measurement grids, the spherical harmonic coefficients can be obtained by least square estimation.

$$\hat{c}=\left(Y^TY\right)^{-1}Y^Tf, \text{ given } f=Yc. \tag{3}$$

By obtaining the spherical harmonic coefficients, HRTF can be interpolated in arbitrary spatial directions by feeding the coefficients into Equation (2). It should be understood that the spherical harmonic interpolation described herein is for illustration only and should not be construed as limiting. Any other HRTF interpolation methods could also be used to generate HRTFs at arbitrary spatial locations.

During the spatial audio generation 508, HRTFs at the active speakers' locations are collected. Each sound source convolves with the HRTFs at the sound source location obtained by relative direction and distance calculation 506. If there are multiple active speakers, the HRTF filtered sounds are combined together, such as through a linear combination, to generate the spatial audio 412 for output.

The spatial audio generator 418 can further perform a direction shifting 510. The direction shifting is implemented to slowly shift the spatial direction of the active speaker audio signal to a center direction with respect to the user, which is natural in human daily conversation. The center direction can be determined as the forward direction of the user (i.e., the direction that the user is facing). The location on the screen that the center direction points to is referred to as the center location for the user. In the example shown in FIG. 6, the user 602 is facing the display screen 604 at an angle and thus the center location 616 is not at the center of the display screen 604. In this example, the center location 616 for user 602 falls on the rightmost participant UI element in the second row.

Figure 6A:
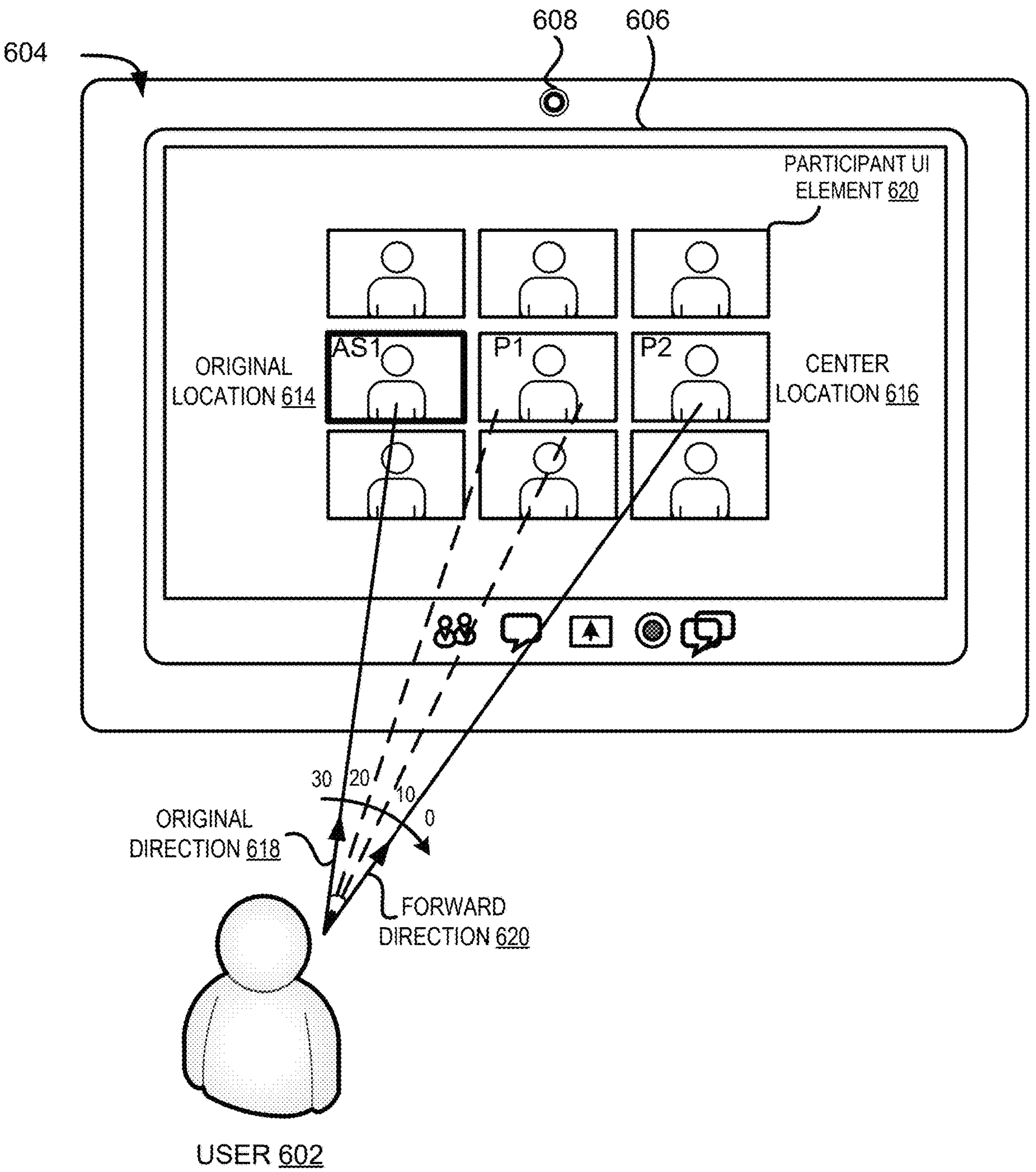
FIGS. 6A and 6B show an example of a display screen presenting a user interface of a video conference application used by participants to join a video conference before and after direction shifting, respectively, according to certain aspects of the present disclosure.
Figure 6B:
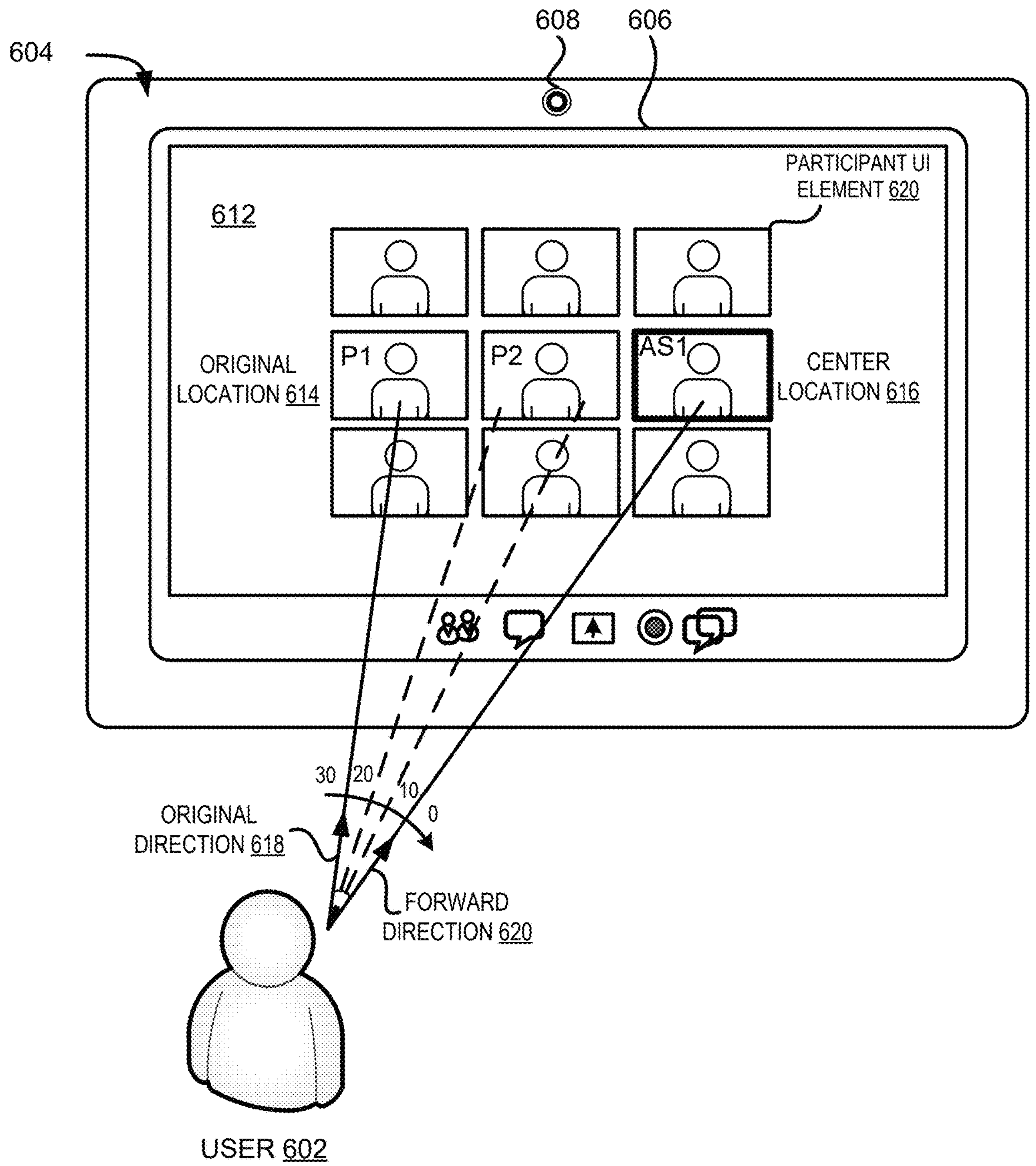

To perform the direction shifting 510, the HRTFs used to convolve with the audio signal will be slowly changing from the original direction to the center direction of the user. For example, as illustrated in FIG. 6A, the current active speaker participant UI element is at 30 degrees on the left. The spatial direction of the HRTFs can move to 20 degrees after several seconds (e.g., 15 seconds), move to 10 degrees after another several seconds, and then move to the zero-degree direction as shown in FIG. 6B. In this example, the direction shifting is performed with a step size of 10 degrees. The step size can be determined based on the difference between the original direction and the center direction and the number of shifting steps to be performed.

In each shifting step, if the direction after the shifting points to a new participant UI element location on the screen, the active speaker's participant UI element can be switched to the new location. For example, in FIG. 6, the 20-degree direction points to a new location, the middle spot of the second row, and thus the shifting also includes switching the active speaker participant UI element (marked as "AS1" in FIG. 6A) with the middle participant UI element (marked as "P1" in FIGS. 6A and 6B). The second shift (i.e., shifting to the 10-degree direction) does not change the participant UI element position and thus the shifting does not involve participant UI element switching. The last shifting from 10-degree direction to 0-degree direction also involves switching the participant UI element of the active speaker (the "AS1" UI element) with the right UI element of the second row (marked as "P2" in FIGS. 6A and 6B). As a result, the spatial audio effect is shifted in conjunction with the visual indication of the active speaker, providing a consistent experience to the meeting participants.

In some examples, a freezing time (e.g., 15 seconds) can be set for the active speaker audio signal in each shifting step. If the active speaker stopped talking but started talking again within the freezing time, the active speaker's audio signal will not convolve with the HRTFs at the screen position of the active speaker participant UI element. Instead, the HRTFs of the last shifting position during the direction shifting is used. If the direction shifting has already been completed, which means the active speaker's sound has already been in the center direction, the active speaker's sound remains in the center direction without further shifting. If the direction shifting has not yet been completed, which means the last shifting position is not in the center direction, then the active speaker's sound direction may resume shifting to the center direction. In some implementations, if the active speaker's sound direction has been shifted to the center direction, then the spatial audio generation can be stopped, and the active speaker's audio signal will be played.

Figure 8:
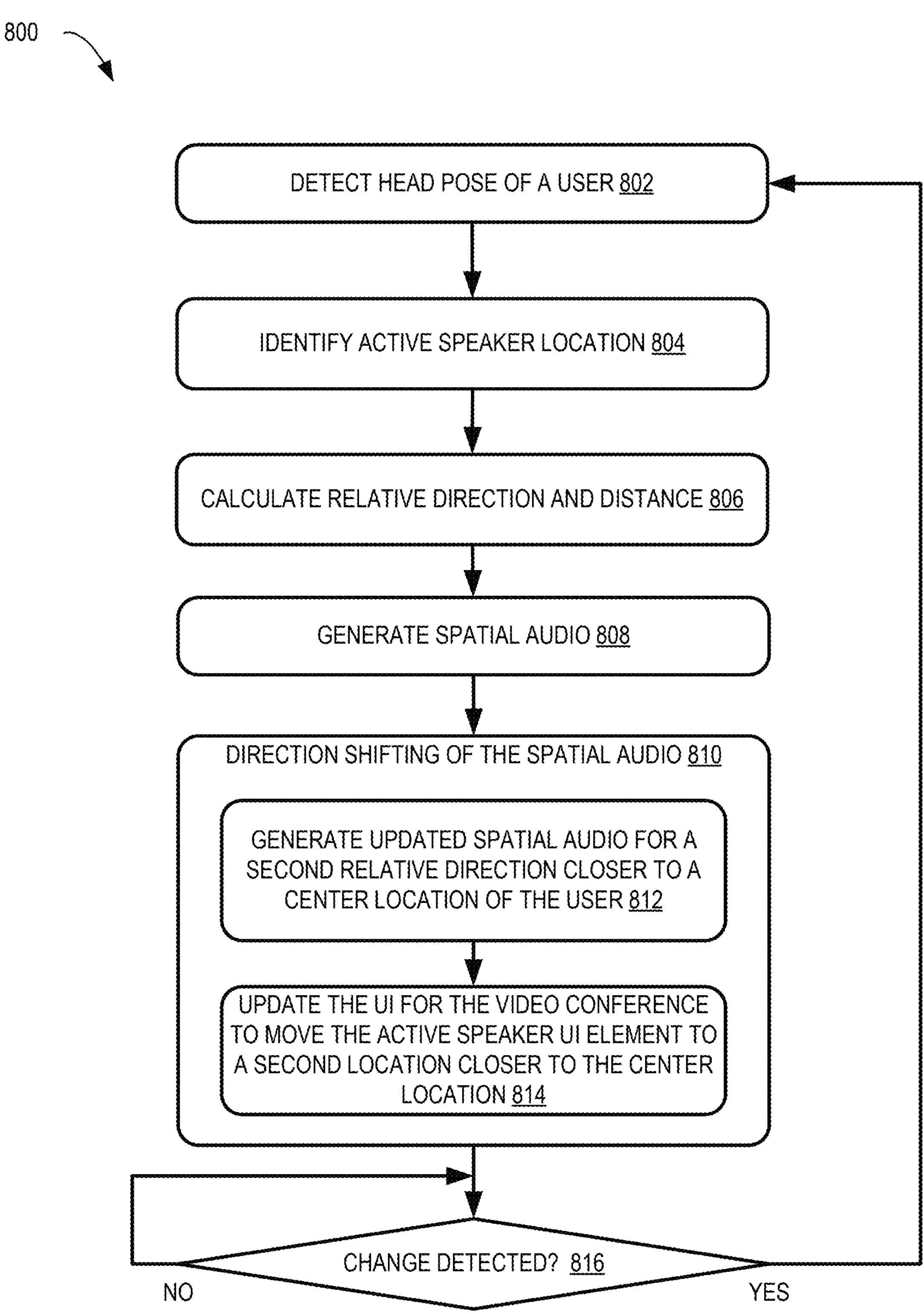
FIG. 8 shows a flowchart depicting a process for generating spatial audio signal for videoconferencing, according to certain aspects of the present disclosure.

FIG. 8 shows a flowchart depicting a process 800 for generating spatial audio signal for videoconferencing, according to certain aspects of the present disclosure. The client computing device 404 can be configured to implement operations depicted in FIG. 8 by executing suitable program code. The software or program code may be stored on a non-transitory storage medium (e.g., on a memory device). The process depicted in FIG. 8 and described below is intended to be illustrative and non-limiting. Although FIG. 8 depicts the various processing blocks occurring in a particular sequence or order, this is not intended to be limiting. In certain alternative embodiments, the blocks may be performed in some different order, or some blocks may also be performed in parallel. For illustrative purposes, the process 800 is described with reference to certain examples depicted in the figures. Other implementations, however, are possible.

At block 810, the process 800 involves detecting the head pose of a user appearing in front of the client computing device who is attending a video conference through the client computing device. As discussed above in detail, the head pose can be detected through face detection technology from a video of the user captured by a camera of the client computing device. Other methods, such as machine learning based methods or Bluetooth technology, can also be utilized to detect the head pose of the user.

At block 804, the process 800 involves identifying the active speaker location. In some examples, the active speaker location is represented by the location of the participant UI element for the active speaker. As discussed above in detail, the location of the participant UI element for the active speaker in the 3D space can be calculated based on information such as the size of the display screen, the location of the camera, the location of the UI for the video conference on the display screen, and the location of the participant UI element within the UI for the video conference.

At block 806, the process 800 involves calculating the relative direction and distance of the participant UI element for the active speaker with respect to the user. The calculation can be based on the head pose of the user and the determined location of the participant UI element for the active speaker. For example, the head pose of the user includes the relative direction and distance between the user and the camera of the client computing device and the relative direction and distance between the camera and the participant UI element are known or can be calculated. The relative direction and distance of the participant UI element for the active speaker with respective to the user can thus be derived based on geometry relationship of the user, the camera, and the participant UI element.

At block 808, the process 800 involves generating the spatial audio for the active speaker's audio signal. As discussed above in detail, the spatial audio can be generated using HRTFs. If there are multiple active speakers, blocks 804-808 can be repeated for each active speaker, and the generated spatial audio for the multiple speakers can be combined to generate the final spatial audio for output.

At block 810, which includes blocks 812 and 814, the process 800 involves the direction shifting of the spatial audio. As discussed above in more detail, the direction shifting includes updating the spatial audio to move the direction of the active speaker's sound to the center location with respect to the user and moving the participant UI element for the active speaker accordingly. At block 812, the spatial audio generator 418 determines a new direction for the audio signal that is closer to a center location of the user than the previous direction. Spatial audio can be generated for the active speaker based on the new direction. At block 814, the spatial audio generator 418 can determine if the new direction points to a new location for the active speaker participant UI element, and if so, update the UI for the video conference to move the active speaker participant UI element to the new location. Otherwise, the location of the active speaker participant UI element remains unchanged. Blocks 812 and 814 can be performed repeatedly for a next new direction that is even closer to the center location of the user until the direction of the spatial audio points to the center location of the user. In some examples, if the center location is reached, the spatial audio generation is stopped.

At block 816, the process 800 involves detecting whether a change has occurred that will trigger an update of the spatial audio generation. The changes can include the user changing head pose, the active speaker UI element being repositioned due to new participants joining the meeting or existing participants exiting the meeting, and so on. Depending on the type of the change, the process 800 may involve re-detecting the head pose of the user at block 802 or re-identifying the active speaker location at block 804 for the next round of spatial audio generation.

Figure 9:
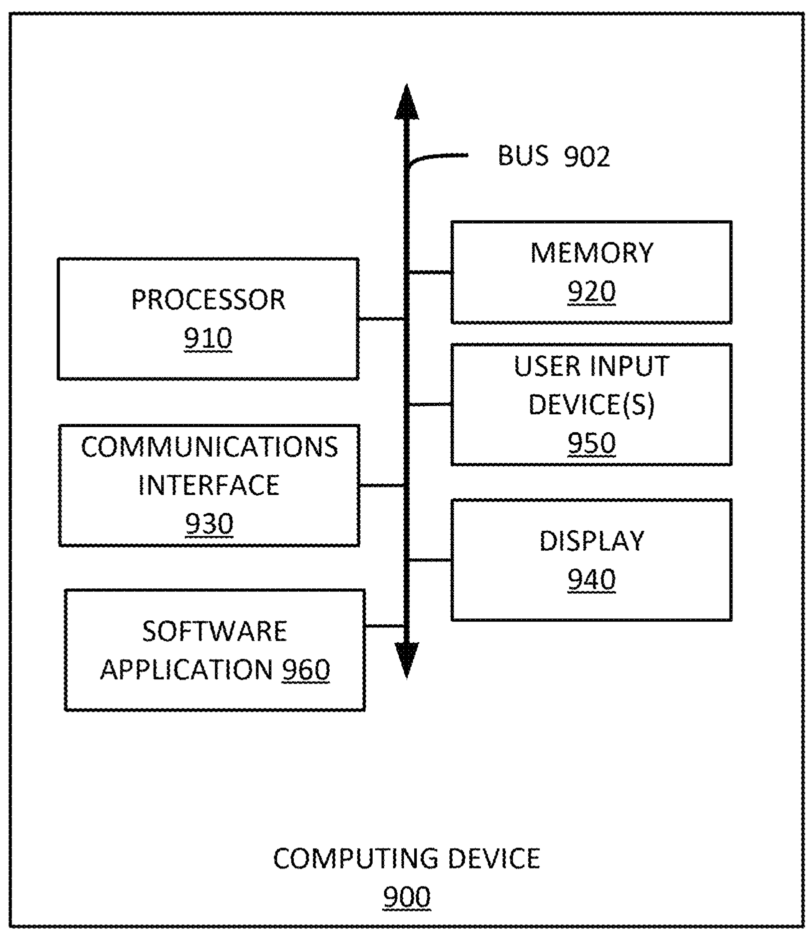
FIG. 9 shows an example computing device suitable for performing certain aspects of the present disclosure.

Referring now to FIG. 9, FIG. 9 shows an example computing device 900 suitable for performing certain aspects of the present disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more processes described herein, such as part or all of the example process 800 described above with respect to FIG. 8. For example, the software application 960 provided on the computing device 900 may provide instructions for performing one or more steps of the process 800. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: A method performed by a computing device, the method comprising: detecting a head pose of a user in front of the computing device that has joined a video conference; determining a first relative direction of a participant user interface (UI) element for an active speaker of the video conference with respect to the user based on a first position of the participant UI element and the head pose of the user, the participant UI element presented in a UI for the video conference displayed on a screen of the computing device; generating spatial audio for at least an audio signal of the active speaker based on the first relative direction; outputting the spatial audio; generating an updated spatial audio based on a second relative direction, wherein the second relative direction is towards a second location closer to a center location on the screen that the user is facing than the first relative direction, the center location determined based on the head pose of the user; and outputting the updated spatial audio.

Example #2: The method of Example #1, further comprising: determining a third relative direction of a participant UI element for a second active speaker with respect to the user based on a third location of the participant UI element for the second active speaker and the head pose of the user, wherein generating the spatial audio further comprising: generating a first individual spatial audio for the audio signal of the active speaker based on the first relative direction and a second individual spatial audio for a second audio signal of the second active speaker based on the second relative direction, and combining the first individual spatial audio and the second individual spatial audio.

Example #3: The method of Examples #1-2, further comprising: modifying the UI for the video conference by moving the participant UI element for the active speaker to the second location; and presenting the modified UI on the computing device.

Example #4: The method of Examples #1-3, wherein generating the spatial audio is performed using head-related transfer functions (HRTFs).

Example #5: The method of Examples #1-4, wherein moving the participant UI element for the active speaker to the second location comprises switching the participant UI element for the active speaker with another participant UI element for another participant positioned at the second location.

Example #6: The method of Examples #1-5, further comprising stopping generating the updated spatial audio and moving the participant UI element for the active speaker towards the center location based on determining that the active speaker is inactive for a threshold number of time period.

Example #7: The method of Examples #1-6, further comprising stopping generating the spatial audio based on determining that the participant UI element for the active speaker has reached the center location.

Example #8: A computing device, comprising: a non-transitory computer-readable medium; and a processor communicatively coupled to the non-transitory computer-readable medium, the processor configured to execute processor-executable instructions stored in the non-transitory computer-readable medium to: detect a head pose of a user in front of the computing device that has joined a video conference; determine a first relative direction of a participant user interface (UI) element for an active speaker of the video conference with respect to the user based on a first location of the participant UI element and the head pose of the user, the participant UI element presented in a UI for the video conference displayed on a screen of the computing device; generate a spatial audio for at least an audio signal of the active speaker based on the first relative direction; output the spatial audio; generate an updated spatial audio based on a second relative direction, wherein the second relative direction is towards a second location closer to a center location on the screen that the user is facing than the first relative direction, the center location determined based on the head pose of the user; and output the updated spatial audio.

Example #9: The computing device of Example #8, wherein the processor is configured to execute processor-executable instructions stored in the non-transitory computer-readable medium to further: determine a third relative direction of a participant UI element for a second active speaker with respect to the user based on a third location of the participant UI element for the second active speaker and the head pose of the user, wherein generating the spatial audio further comprising: generating a first individual spatial audio for the audio signal of the active speaker based on the first relative direction and a second individual spatial audio for a second audio signal of the second active speaker based on the second relative direction, and combining the first individual spatial audio and the second individual spatial audio.

Example #10: The computing device of Examples #8-9, wherein the processor is configured to execute processor-executable instructions stored in the non-transitory computer-readable medium to further: modifying the UI for the video conference by moving the participant UI element for the active speaker to the second location; and presenting the modified UI on the computing device.

Example #11: The computing device of Examples #8-10, wherein generating the spatial audio is performed using head-related transfer functions (HRTFs).

Example #12: The computing device of Examples #8-11, wherein moving the participant UI element for the active speaker to the second location comprises switching the participant UI element for the active speaker with another participant UI element for another participant positioned at the second location.

Example #13: The computing device of Examples #8-12, wherein the processor is configured to execute processor-executable instructions stored in the non-transitory computer-readable medium to further stop generating the updated spatial audio and moving the participant UI element for the active speaker towards the center location based on determining that the active speaker is inactive for a threshold number of time period.

Example #14: The computing device of Examples #8-13, wherein the processor is configured to execute processor-executable instructions stored in the non-transitory computer-readable medium to further stop generating the spatial audio based on determining that the participant UI element for the active speaker has reached the center location.

Example #15: A non-transitory computer-readable medium comprising processor-executable instructions configured to cause one or more processors to: detect a head pose of a user in front of a computing device that has joined a video conference; determine a first relative direction of a participant user interface (UI) element for an active speaker of the video conference with respect to the user based on a first location of the participant UI element and the head pose of the user, the participant UI element presented in a UI for the video conference displayed on a screen of the computing device; generate a spatial audio for at least an audio signal of the active speaker based on the first relative direction; output the spatial audio; generate an updated spatial audio based on a second relative direction, wherein the second relative direction is towards a second location closer to a center location on the screen that the user is facing than the first relative direction, the center location determined based on the head pose of the user; and play the updated spatial audio.

Example #16: The non-transitory computer-readable medium of Example #15, wherein the processor-executable instructions are configured to further cause the one or more processors to: determine a third relative direction of a participant UI element for a second active speaker with respect to the user based on a third location of the participant UI element for the second active speaker and the head pose of the user, wherein generating the spatial audio further comprising: generating a first individual spatial audio for the audio signal of the active speaker based on the first relative direction and a second individual spatial audio for a second audio signal of the second active speaker based on the second relative direction, and combining the first individual spatial audio and the second individual spatial audio.

Example #17: The non-transitory computer-readable medium of Examples #15-16, wherein the processor-executable instructions are configured to further cause the one or more processors to: modifying the UI for the video conference by moving the participant UI element for the active speaker to the second location; and presenting the modified UI on the computing device.

Example #18: The non-transitory computer-readable medium of Examples #15-17, wherein generating the spatial audio is performed using head-related transfer functions (HRTFs).

Example #19: The non-transitory computer-readable medium of Examples #15-18, wherein moving the participant UI element for the active speaker to the second location comprises switching the participant UI element for the active speaker with another participant UI element for another participant positioned at the second location.

Example #20: The non-transitory computer-readable medium of Examples #15-19, wherein the processor-executable instructions are configured to further cause the one or more processors to: stop generating the updated spatial audio and moving the participant UI element for the active speaker towards the center location based on determining that the active speaker is inactive for a threshold number of time period.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by a computing device, the method comprising:

detecting a head pose of a user in front of the computing device that has joined a video conference;

determining a first relative direction of a participant user interface (UI) element for an active speaker of the video conference with respect to the user based on a first position of the participant UI element and the head pose of the user, the participant UI element comprising a window and a representation of a corresponding participant presented in a UI for the video conference displayed on a screen of the computing device;

generating spatial audio for at least an audio signal of the active speaker based on the first relative direction;

outputting the spatial audio;

generating an updated spatial audio based on a second relative direction, wherein the second relative direction is towards a second location closer to a center location on the screen that the user is facing than the first relative direction, the center location determined based on the head pose of the user; and outputting the updated spatial audio.

2. The method of claim 1, further comprising:

determining a third relative direction of a participant UI element for a second active speaker with respect to the user based on a third location of the participant UI element for the second active speaker and the head pose of the user, wherein generating the spatial audio further comprising:

generating a first individual spatial audio for the audio signal of the active speaker based on the first relative direction and a second individual spatial audio for a second audio signal of the second active speaker based on the second relative direction, and combining the first individual spatial audio and the second individual spatial audio.

3. The method of claim 1, further comprising:

modifying the UI for the video conference by moving the participant UI element for the active speaker to the second location; and presenting the modified UI on the computing device.

4. The method of claim 1, wherein generating the spatial audio is performed using head-related transfer functions (HRTFs).

5. The method of claim 1, wherein moving the participant UI element for the active speaker to the second location comprises switching the participant UI element for the active speaker with another participant UI element for another participant positioned at the second location.

6. The method of claim 1, further comprising stopping generating the updated spatial audio and moving the participant UI element for the active speaker towards the center location based on determining that the active speaker is inactive for a threshold time period.

7. The method of claim 1, further comprising stopping generating the spatial audio based on determining that the participant UI element for the active speaker has reached the center location.

8. A computing device, comprising:

a non-transitory computer-readable medium; and a processor communicatively coupled to the non-transitory computer-readable medium, the processor configured to execute processor-executable instructions stored in the non-transitory computer-readable medium to:

detect a head pose of a user in front of the computing device that has joined a video conference;

determine a first relative direction of a participant user interface (UI) element for an active speaker of the video conference with respect to the user based on a first location of the participant UI element and the head pose of the user, the participant UI element comprising a window and a representation of a corresponding participant presented in a UI for the video conference displayed on a screen of the computing device;

generate a spatial audio for at least an audio signal of the active speaker based on the first relative direction;

output the spatial audio;

generate an updated spatial audio based on a second relative direction, wherein the second relative direction is towards a second location closer to a center location on the screen that the user is facing than the first relative direction, the center location determined based on the head pose of the user; and output the updated spatial audio.

9. The computing device of claim 8, wherein the processor is configured to execute processor-executable instructions stored in the non-transitory computer-readable medium to further:

determine a third relative direction of a participant UI element for a second active speaker with respect to the user based on a third location of the participant UI element for the second active speaker and the head pose of the user, wherein generating the spatial audio further comprising:

generating a first individual spatial audio for the audio signal of the active speaker based on the first relative direction and a second individual spatial audio for a second audio signal of the second active speaker based on the second relative direction, and combining the first individual spatial audio and the second individual spatial audio.

10. The computing device of claim 8, wherein the processor is configured to execute processor-executable instructions stored in the non-transitory computer-readable medium to further:

modifying the UI for the video conference by moving the participant UI element for the active speaker to the second location; and presenting the modified UI on the computing device.

11. The computing device of claim 8, wherein generating the spatial audio is performed using head-related transfer functions (HRTFs).

12. The computing device of claim 8, wherein moving the participant UI element for the active speaker to the second location comprises switching the participant UI element for the active speaker with another participant UI element for another participant positioned at the second location.

13. The computing device of claim 8, wherein the processor is configured to execute processor-executable instructions stored in the non-transitory computer-readable medium to further stop generating the updated spatial audio and moving the participant UI element for the active speaker towards the center location based on determining that the active speaker is inactive for a threshold time period.

14. The computing device of claim 8, wherein the processor is configured to execute processor-executable instructions stored in the non-transitory computer-readable medium to further stop generating the spatial audio based on determining that the participant UI element for the active speaker has reached the center location.

15. A non-transitory computer-readable medium comprising processor-executable instructions configured to cause one or more processors to:

detect a head pose of a user in front of a computing device that has joined a video conference;

determine a first relative direction of a participant user interface (UI) element for an active speaker of the video conference with respect to the user based on a first location of the participant UI element and the head pose of the user, the participant UI element comprising a window and a representation of a corresponding participant presented in a UI for the video conference displayed on a screen of the computing device;

generate a spatial audio for at least an audio signal of the active speaker based on the first relative direction;

output the spatial audio;

generate an updated spatial audio based on a second relative direction, wherein the second relative direction is towards a second location closer to a center location on the screen that the user is facing than the first relative direction, the center location determined based on the head pose of the user; and play the updated spatial audio.

16. The non-transitory computer-readable medium of claim 15, wherein the processor-executable instructions are configured to further cause the one or more processors to:

determine a third relative direction of a participant UI element for a second active speaker with respect to the user based on a third location of the participant UI element for the second active speaker and the head pose of the user, wherein generating the spatial audio further comprising:

generating a first individual spatial audio for the audio signal of the active speaker based on the first relative direction and a second individual spatial audio for a second audio signal of the second active speaker based on the second relative direction, and combining the first individual spatial audio and the second individual spatial audio.

17. The non-transitory computer-readable medium of claim 15, wherein the processor-executable instructions are configured to further cause the one or more processors to:

modifying the UI for the video conference by moving the participant UI element for the active speaker to the second location; and presenting the modified UI on the computing device.

18. The non-transitory computer-readable medium of claim 15, wherein generating the spatial audio is performed using head-related transfer functions (HRTFs).

19. The non-transitory computer-readable medium of claim 15, wherein moving the participant UI element for the active speaker to the second location comprises switching the participant UI element for the active speaker with another participant UI element for another participant positioned at the second location.

20. The non-transitory computer-readable medium of claim 15, wherein the processor-executable instructions are configured to further cause the one or more processors to: stop generating the updated spatial audio and moving the participant UI element for the active speaker towards the center location based on determining that the active speaker is inactive for a threshold time period.

* * * * *